Jan. 17, 1928.

W. F. BROWN 1,656,691

LAMINATED GLASS

Filed June 28, 1926

Inventor
Wilbur F Brown
By Frank Fraser
Attorney

Patented Jan. 17, 1928.

1,656,691

UNITED STATES PATENT OFFICE.

WILBUR F. BROWN, OF TOLEDO, OHIO, ASSIGNOR TO THE LIBBEY-OWENS SHEET GLASS COMPANY, OF TOLEDO, OHIO, A CORPORATION OF OHIO.

LAMINATED GLASS.

Application filed June 28, 1926. Serial No. 118,986.

The present invention relates to laminated glass, and to the process of producing the same.

An important object of the invention is to provide, as a new article of manufacture, a sheet of laminated glass and a process of producing the same wherein a plurality of sheets of glass and a sheet of non-brittle material are united by the aid of Canada balsam.

Another object of the invention is to provide a process for producing laminated glass wherein a sheet of glass is provided with a skin of cellulose composition material or the like, which skin is united to a sheet of non-brittle material by applying a film or coating of Canada balsam between said surfaces and uniting the same under the action of heat and pressure.

Another object of the invention is to provide the process for producing laminated glass consisting in spraying a solution of cellulose material on a sheet of glass, permitting the solution to dry to form a skin on said sheet of glass, then spraying or otherwise applying a film or coating of liquid Canada balsam on said skin, then applying a film of liquid Canada balsam to a sheet of non-brittle material such as cellulose composition material, superimposing one sheet upon the other sheet, and then pressing the same to squeeze out excess Canada balsam and to cause a union between said sheets.

Other objects and advantages of the invention will become apparent during the course of the following description.

Figure 1:
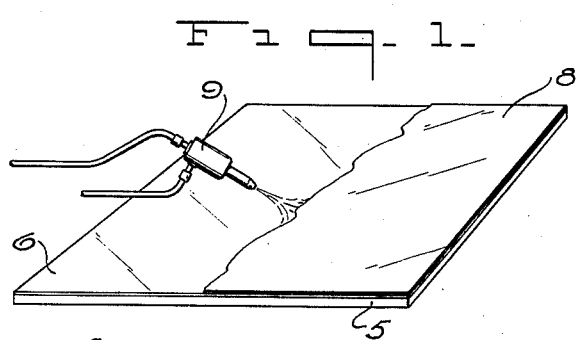
Figure 2:
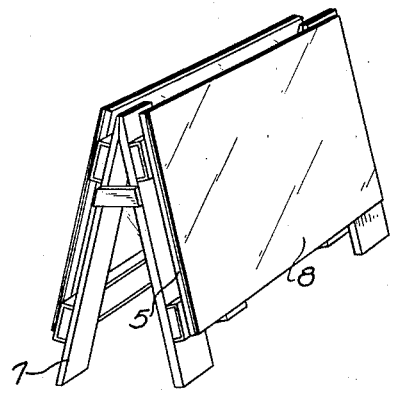
Figure 3:
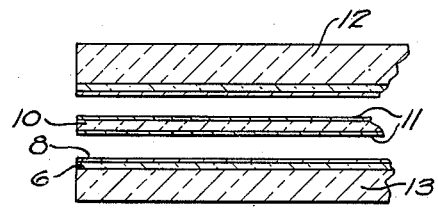
Figure 4:
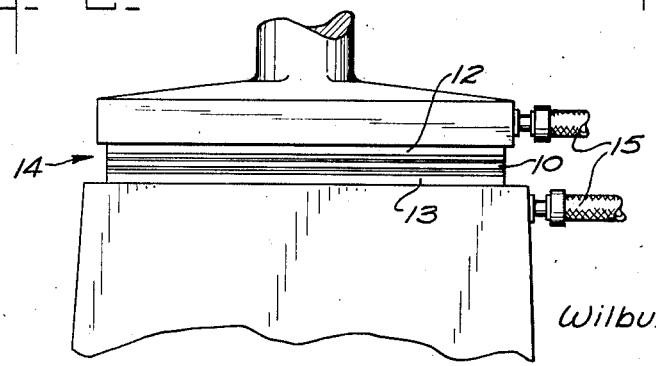

In the drawings wherein like numerals are employed to designate like parts throughout the same, Fig. 1 is a perspective view illustrating the spraying of one of the laminations, Fig. 2 represents a rack for supporting the sheets, Fig. 3 illustrates in section the laminations after they have been treated and before they have been united, and Fig. 4 illustrates the finished product in a press.

In the drawings the numeral 5 designates a sheet of glass which is preferably transparent, the surfaces of which may be ground and polished as desired, although it is not absolutely necessary. A skin of preferably cellulose composition material 6 is formed on the sheet of glass 5. This skin may be applied to the sheet in the form of a liquid spray, the cellulose material being dissolved in a suitable solvent and sprayed on, after which the sheet may be placed in a rack 7 so that the solvents or other liquids may be evaporated off. The rack or other form of supporting means for the sheet during the drying of the skin may be arranged in a suitable compartment, the temperature and humidity of which can be controlled. After the solution has been dried, a skin of transparent material, having an excellent bond with the glass, is carried thereby. After the skin is dried a film of Canada balsam 8 is applied thereto. The Canada balsam may be brushed on, or if it is desired, may be dissolved in some solvent such as xylol and sprayed on by means of a spray 9. The xylol may be permitted to evaporate if it is desired before the sheet of glass is united to a sheet of non-brittle material 10. The sheet of non-brittle material, which may be any of the well known cellulose composition materials, may be likewise provided with a skin and a film of Canada balsam 11. As shown in Fig. 3, two sheets of glass 12 and 13 respectively and the non-brittle sheet 10 have been treated and are adapted to be united.

The laminations may be placed in a press 14 illustrated diagrammatically in Fig. 4 of the drawings. The press is preferably constructed so that a pressure will be applied initially centrally of the laminations whereby all excess Canada balsam will be squeezed out from between the laminations. Conduits 15 may be provided for the purpose of circulating a heating medium through the platens of the press 14.

After the laminations have been subjected to the necessary pressure and temperature, they will, after they have been removed from the press, be permanently united. A sheet formed in accordance with this invention will be capable of standing shocks and will not develop to any considerable extent at least so-called "let-goes."

Although the skin on the sheet of glass and the sheet of non-brittle material are preferably formed from a cellulose composition material, any other material having substantially the same general characteristics can be used.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. As a new article of manufacture, a sheet of laminated glass including a sheet of glass having a skin thereon which has been coated with a film of Canada balsam.

2. As a new article of manufacture, a sheet of laminated glass comprising a sheet of glass, a skin thereon, a film of Canada balsam, and a sheet of non-brittle material.

3. As a new article of manufacture, a sheet of laminated glass, comprising two sheets of glass, a skin of cellulose composition material, on one side each of both of said sheets of glass, a film of Canada balsam on both skins, and a sheet of non-brittle material between each of said films of Canada balsam.

Signed at Toledo, in the county of Lucas and State of Ohio, this 24th day of June, 1926.

WILBUR F. BROWN.